United States Patent [19]

Huls

[11] Patent Number: 5,404,865
[45] Date of Patent: Apr. 11, 1995

[54] PORTABLE OUTSIDE HEATER

[76] Inventor: Dale J. Huls, 335 8th Ave. SW., LeMars, Iowa 51031

[21] Appl. No.: 149,474

[22] Filed: Nov. 9, 1993

[51] Int. Cl.⁶ .............................................. A61F 7/00
[52] U.S. Cl. ..................................... 126/206; 34/232; 454/903; 432/222
[58] Field of Search ............... 126/110 B, 110 D, 204, 126/205, 208, 206; 34/232; 454/306, 903

[56] References Cited

U.S. PATENT DOCUMENTS

| | | | |
|---|---|---|---|
| 2,567,323 | 9/1951 | Cyphert . | |
| 2,824,575 | 2/1958 | Rosen | 454/306 |
| 2,829,635 | 4/1958 | Teller . | |
| 3,600,823 | 12/1968 | Borron | 34/232 |
| 3,858,567 | 1/1975 | Slogaski | 126/206 |
| 3,916,870 | 11/1975 | Beavers | 126/110 B |
| 3,948,246 | 4/1976 | Jenkins | 126/204 |
| 4,050,163 | 9/1977 | Short | 34/232 |
| 4,085,725 | 4/1978 | Mesenbrink | 126/110 B |
| 4,134,615 | 1/1979 | Jenkins | 297/180 |
| 4,225,774 | 9/1980 | Taberman | 219/217 |
| 4,226,363 | 10/1980 | Sheldon | 237/54 |
| 4,307,701 | 12/1981 | Balon et al. | 126/110 B |
| 4,403,732 | 9/1983 | Primich | 454/903 |
| 4,676,223 | 6/1987 | Peterson | 126/208 |
| 5,095,942 | 3/1992 | Murphy | 454/903 |

*Primary Examiner*—Henry C. Yuen
*Attorney, Agent, or Firm*—Zarley, McKee, Thomte, Voorhees & Sease

[57] ABSTRACT

A portable outdoor heater comprises a plurality of hollow, rigid drum sections releasably connected in an end-to-end relationship so as to form an elongated conduit having a horizontally disposed longitudinal axis. Adjacent drum sections are releasably secured to one another by hasps. A propane burner extends into one end of the conduit to provide heat into the drums. The drums each have a plurality of holes therein through which the heat dissipates. A container is provided for holding balls, gloves and other objects to be warmed. In use, the heater can simultaneously warm many people standing adjacent the drum sections, leaning against the drum sections, or sitting upon the drum sections. The heater can be quickly and easily disassembled for storage and transportation.

18 Claims, 2 Drawing Sheets

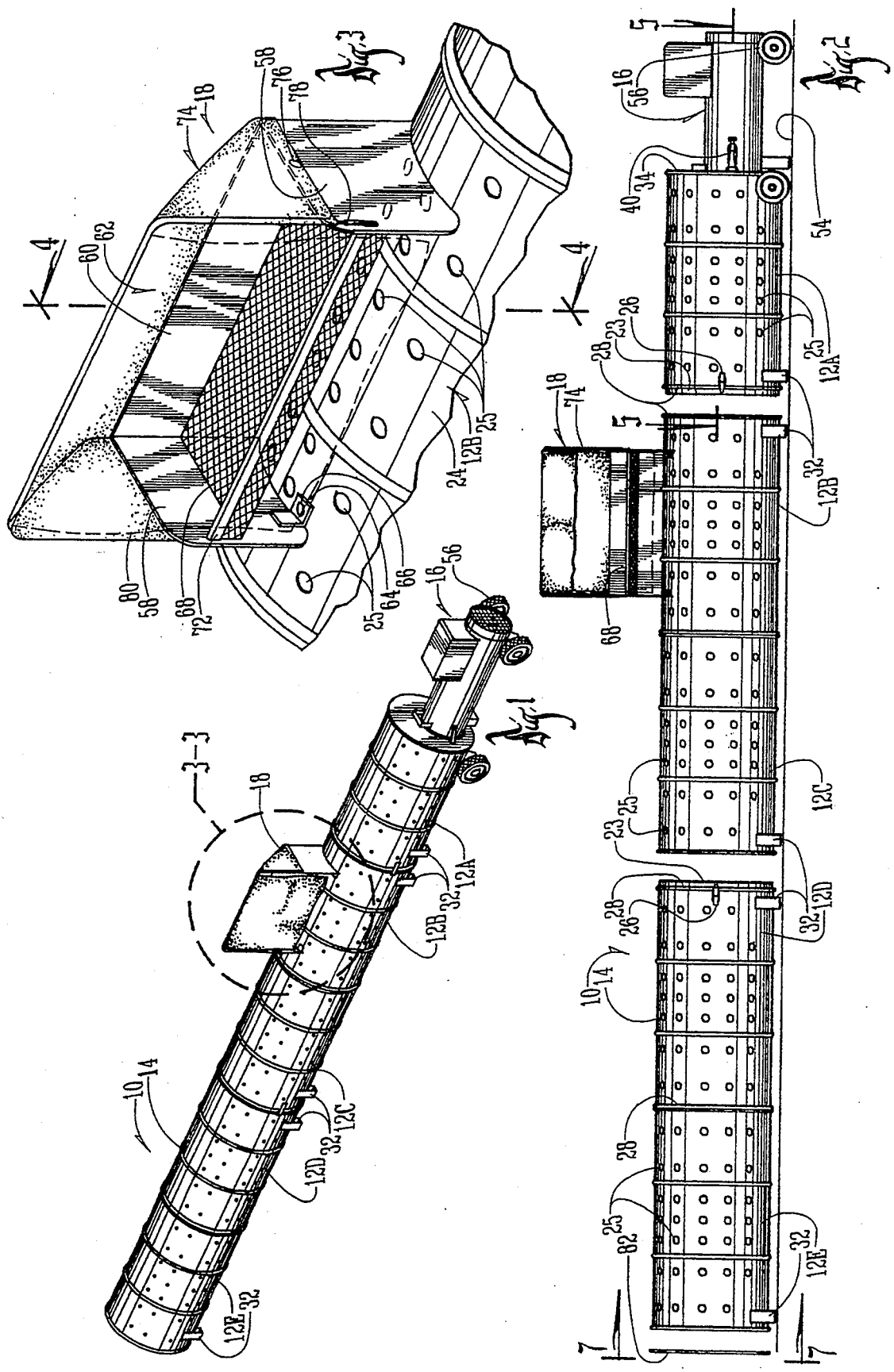

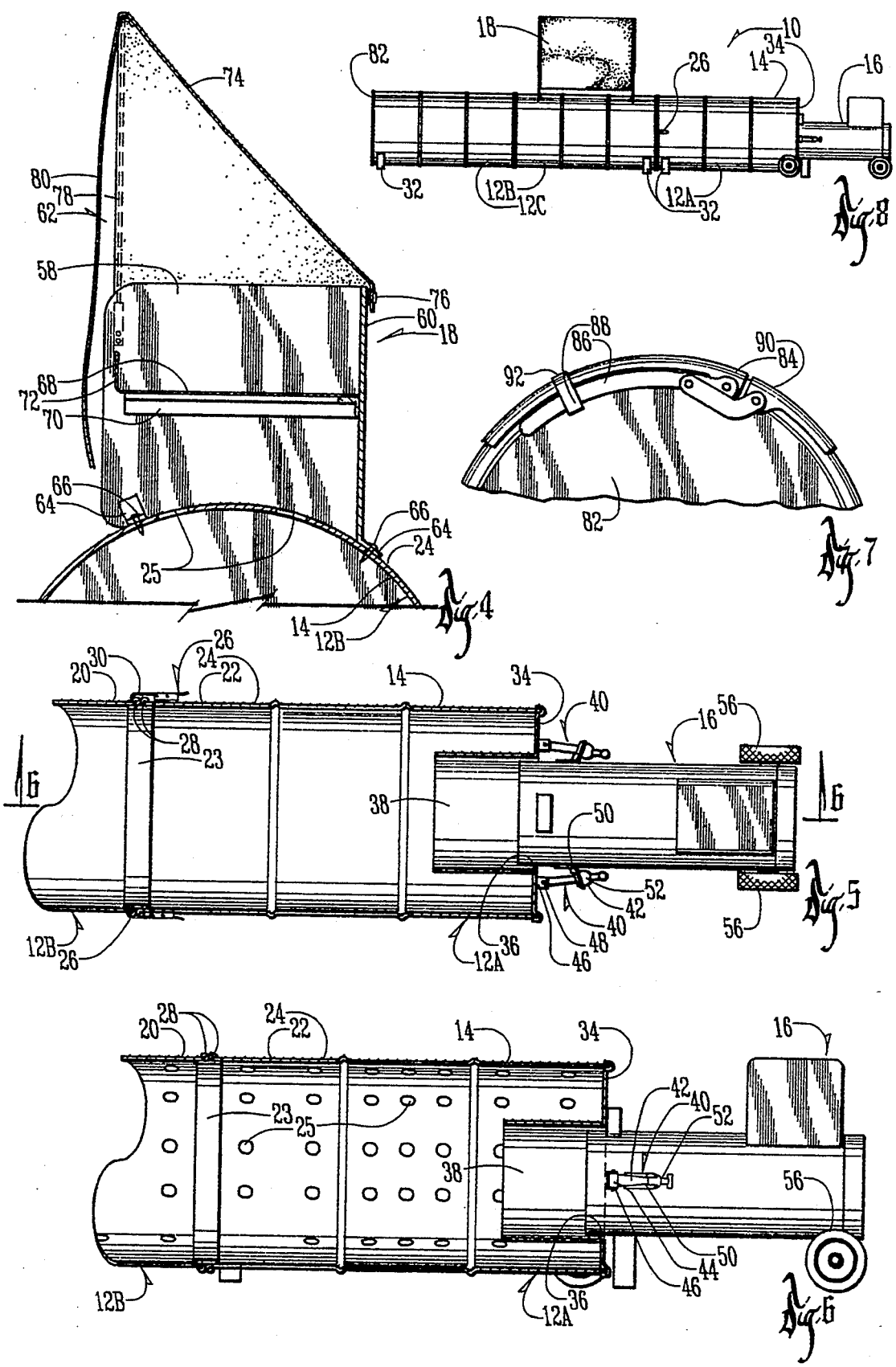

5,404,865

PORTABLE OUTSIDE HEATER

BACKGROUND OF THE INVENTION

Many outdoor activities take place in the fall, winter and spring when the weather is cold. For example, fall sports, such as football and soccer are often played in cold weather. Outdoor winter sports, such as hockey necessarily are played in cold weather. Spring sports, such as track and tennis are also often played when the temperatures are cool or cold. Other activities, such as marching band practice, also occur when the temperatures may be cold.

Therefore, it is desirable to have an outdoor heater for the players, coaches, cheerleaders and other people who are often only dressed in lightweight team uniforms. Prior art warmers have typically been small in size such that they are effective for only one, or a small number of people. Larger prior art heaters which can be used to warm many people typically are not portable due to their size and construction.

Therefore, a primary objective of the present invention is the provision of an improved outdoor heater for warming many people simultaneously.

Another objective of the present invention is the provision of a portable outdoor heater.

A further objective of the present invention is the provision of a portable outdoor heater having a rigid construction so as to serve as a warming bench.

Still another objective of the present invention is the provision of an outdoor heater which can be quickly and easily disassembled for storage and transportation.

Yet another objective of the present invention is the provision of an outdoor heater having a container for warming balls, gloves, and other objects.

Another objective of the present invention is the provision of an outdoor heater which is durable in construction, and efficient and safe in use.

These and other objectives will become apparent from the following description of the invention.

SUMMARY OF THE INVENTION

The portable outdoor heater of the present invention includes a plurality of drums, barrels or conduit sections detachably secured in an end-to-end relationship so as to form an elongated conduit having a horizontally disposed longitudinal axis. A forced air propane burner is provided in one end of the conduit. The conduit has a plurality of holes therein through which the heat from the burner can dissipate to warm the people standing adjacent, leaning against, or sitting upon the conduit. The temperature from the burner is maintained sufficiently low such that the sidewall of the conduit does not become excessively hot, so as to prevent injury to the people being warmed by the heater. The drum sections are secured together by releasable hasps secured adjacent the end of one drum and engaging a perimeter bead on the end of an adjacent drum. The heater also includes a container or receptacle mounted on top of one of the drum sections for holding balls, gloves, and other objects to be warmed. The container includes a cover so as to protect the objects from rain and snow. Wheels may be provided on one or more of the drum sections for moving the heater to a desired location. Legs are provided on the conduit so as to prevent the cylindrical conduit from rolling.

BRIEF DESCRIPTION OF THE DRAWINGS

FIG. 1 is a perspective view of the portable outdoor heater of the present invention in an assembled state.

FIG. 2 is an exploded side elevation view of the heater in a disassembled state.

FIG. 3 is a perspective view of a ball warmer container.

FIG. 4 is a sectional view of the container taken along lines 4—4 of FIG. 3.

FIG. 5 is a sectional view taken along lines 5—5 of FIG. 2 showing one end of the heater with the burner attached.

FIG. 6 is a sectional view taken along lines 6—6 of FIG. 5.

FIG. 7 is an end elevation view taken along lines 7—7 of FIG. 2.

FIG. 8 is a side elevation schematic view showing a shorter alternative embodiment of the portable outdoor heater.

DETAILED DESCRIPTION OF THE DRAWINGS

The portable heater of the present invention is generally designated in the drawings by the reference numeral 10. The heater 10 includes a plurality of drum or barrel sections 12 which are connected in an end-to-end relationship so as to form an elongated conduit 14. Preferably, the drum sections 12 are cylindrical such that the conduit 14 has a horizontally disposed longitudinal axis. In FIGS. 1 and 2, five drum sections 12A, 12B, 12C, 12D, and 12E are shown, though more or less drums may be utilized in constructing the heater 10. The heater also includes a propane burner 16 which provides heat to the interior of the conduit 14, and a container or receptacle 18 for warming balls, gloves, and other objects.

Each of the drum sections 12 is preferably made from a conventional three foot long 55 gallon drum. Each drum has opposite ends 20 and 22. As seen in FIG. 2, the adjacent ends of drums 12B and 12C are welded, or otherwise secured together. Similarly, the adjacent ends of the drums 12D and 12E are welded or otherwise secured together. A ring 23 having an outside diameter matching the inside diameter of the drums is welded or otherwise secured to the end 22 of drum 12A and the end 20 of drum 12D. Preferably, the ring 23 is approximately three inches in width, and extends one and one-half inches into and out of drums 12A and 12D. The exposed end of the ring 23 on drum 12A is adapted to fit into the end 20 of drum 12B, while the exposed end of the ring 23 in drum 12D is adapted to fit within the end 22 of drum 12C. Each drum section also has a plurality of holes 25 drilled through the side wall 24 thereof. Preferably, each drum section has a 5×6 array of holes 25 on one side thereof.

Securement means are provided for detachably securing drums 12A and 12B, and drums 12C and 12D together. Preferably, as shown in the drawings, the securement means is a plurality of draw hasps 26, one of which is positioned on each side of drums 12A and 12D. More particularly, as seen in the drawings, hasps 26 are secured by bolts, rivets, or other conventional means to the drums 12A and 12D adjacent the first end 20 thereof. A perimeter bead 28 is conventionally provided on each end of the drums, such that the beads on adjacent drums abut one another. The catch member 30 of each hasp 26 releasably engages the respective perimeter bead 28 on drum 12B or 12C to secure the adjacent drums together. The hasps 26 are commercially available from National Manufacturing Co. of Sterling, Ill. A preferred hasp is the 4 inch model V35. Legs 32 are provided on the drum sections to prevent them from rolling about their longitudinal axis.

The first end 20 of the first drum 12A includes an end wall 34 having an opening 36 therein. A tube 38 is welded to the end wall 34 and extends inwardly from the hole 36 into the drum 12A, as best seen in FIGS. 5 and 6. The propane burner 16 extends partially into the burner tube 38 such that the flame from the burner is generated within the drum 12A. The burner 16 is secured to the drum 12A by a pair of clamps 40. As seen in the drawings, the clamps 40 are shown to be a rubber hold down member 42 with a T-handle. The member 42 has a first end 44 fit between a pair of ears 46 on the front wall 34 of the drum 12A, and secured by a pin 46. A slotted catch member 50 is bolted or riveted on each side of the burner 16 for realeasably catching the rubber ball 52 on the member 42. The burner clamps 40 are conventional truck hood hold down clamps manufactured by Balkamp, Inc. of Indianapolis, Ind., and commercially available from NAPA auto parts stores.

Preferably, the burner tube is constructed of 20 gauge iron and has a diameter of 14 inches corresponding to the diameter of the hole 36 in the end wall 34. The hole 36 is preferably centered 12 inches from the ground or support surface 54 so as to receive the burner 16.

The burner 16 is commercially available from M & M Manufacturing of Beresford, S. Dak. under the trademarks Rebel and Commander. One acceptable burner is model AG-76 with 1425 C.F.M. of forced air, and having a double wall heat chamber to provide a low exterior chassis temperature. The burner 16 includes wheels 56 for portability. A wind diverter shield, also commercially available from M & M, may be used on the burner to prevent the burner flame from being accidentally blown out by wind.

The container or receptacle 18 for warming balls, gloves and other objects includes opposite end walls 58, a back wall 60, and a substantially open front 62. Each end wall 58 includes a pair of spaced apart ears or tabs 64 each having a hole therein such that the container 18 can be mounted on the side wall 24 of one of the drums 12B or 12C using bolts or screws 66. A shelf 68 formed from a lattice-type grate is secured to a shelf support flange 70 on each end wall 58 of the container 18. The shelf 68 may include an upturned front edge 72 to prevent balls from rolling out of the container 18. A cover 74 is also provided for the ball container 18. The cover 74 is preferably made of a fabric material, such as pack cloth. The cover 74 is attached to the container 18 by a plurality of snaps 76 and a U-shaped support rod 78. A front flap 80 may be moved between a closed position covering the open front 62 of the container 18 and an open position folded back over the top of the support rods 78 to provide access to the shelf 68. The cover 74 helps retain heat within the container 18 and also helps to protect the contents of the container from rain and snow.

The last drum 12E includes an end wall 82 which is secured by a conventional drum lid latch 84. Latch 84 is mounted upon the end wall 82 and includes a pivotal latch arm 86 and a catch member 88 for receiving the free end of the latch arm 86. The latch arm 86 and the catch member 88 both include hook members 90, 92 respectively which overlappingly engage the perimeter bead 28 on the drum 12E.

To set up the heater 10, the drum sections can be carried to the desired location on the field, track or other outdoor site. Drum 12B is then connected to 12A and drum 12D is connected to drum 12C in an end-to-end relationship with the hasps 26 to form the 15 feet long conduit 14. The end wall 82 is attached to drum 12E by latch 84. The burner 16 is positioned within the opening 36 in the front end wall 34, and secured to the first drum by the burner clamps 40. The burner 16 can then be actuated to heat the air within the conduit 14 and thereby heat the side walls 24 of the drums 12. The heat in the conduit 14 dissipates through the drum side walls 24 and the holes 25. The holes 25 in the drum sections also help to relieve pressure on the burner, though the connection between the burner 16 and the drum section 12A is not airtight.

People can stand adjacent, lean against, or sit upon the drums so as to be warmed. The burner Btu's are within safe limits so as to avoid burning of people or clothing. Also, due to the cylindrical shape of the drums, a person facing the drums can extend his or her feet partially beneath the drums so as to warm their toes. Also, the balls and gloves can be positioned within the container or receptacle 18 so as to be kept warm and dry.

An alternative embodiment heater 10A is shown in FIG. 8. The heater 10A is substantially identical to the heater 10, except that drum sections 12D and 12E are not utilized, and the end wall 82 is attached to drum 12C by latch 84. The remaining structure of the heater 10A is identical to that of heater 10 described above.

When the heater 10 or 10A is not being used, the drum sections can be disassembled and stored at a location remote from the field. Also, since the drum sections can be disassembled, the heaters can be conveniently shipped and transported.

The drum sections can be painted in team colors with automotive or industrial paint. Also, the side wall of the drum sections can include a team name and/or logo.

The invention has been shown and described above in connection with the preferred embodiment, and it is understood that many modifications, substitutions and additions may be made which are within the intended broad scope of the invention. From the foregoing, it can be seen that the present invention accomplishes at least all of the stated objectives.

What is claimed is:

1. A heater for use outside in warming people, comprising:

an elongated conduct having a rigid cylindrical sidewall terminating in opposite first and second ends with a plurality of holes in the sidewall, and having a horizontally disposed longitudinal axis;

the conduit being formed from a plurality of cylindrical drum sections detachably secured in end-to-end relation, each drum section having opposite ends;

securement means for securing the ends of adjacent drum sections together, the securement means including a releasable hasp on one of the adjacent drum sections and a securing bead on the other of the adjacent drum sections, the hasp releasably engaging the securing bead; and a heat source extending into the first end of the conduit for generating heat within the conduit, the heat dissipating through the sidewall and the holes therein for warming one or more persons adjacent the conduit.

2. The heater of claim 1 wherein adjacent drum sections having mating ends.

3. The heater of claim 1 wherein adjacent drum sections have overlapping male and female ends.

4. The heater of claim 1 further comprising an end wall on the first end of the conduit with an opening therein for receiving a portion of the heat source.

5. The heater of claim 1 further comprising an end wall on the second end of the conduit.

6. The heater of claim 1 further comprising a container mounted on an upper portion of the conduit for storing an object to be warmed.

7. The heater of claim 6 wherein the container includes a shelf for holding the object and through which heat from the conduit passes to warm the object.

8. The heater of claim 6 wherein the container includes a cover movable between an open position providing access to the container and a closed position for retaining heat in the container.

9. The heater of claim 1 further comprising legs on the conduit to prevent the conduit from rolling about the longitudinal axis.

10. The heater of claim 1 further comprising wheels on the conduit for moving the conduit to a desired location.

11. A portable heater comprising:

a plurality of hollow, rigid conduit sections each having opposite ends and a longitudinal axis, and being positioned in end-to-end relation;

connectors for connecting adjacent conduit sections together;

a source of heat extending into one of the conduit sections so as to provide heat to all sections;

each conduit section having a plurality of apertures therein for the dissipation of heat; and legs on each conduit section to prevent rolling of the sections about the longitudinal axis.

12. The portable heater of claim 11 further comprising a container mounted on one of the conduit sections for holding objects to be heated.

13. The portable heater of claim 11 wherein the conduit sections are cylindrical.

14. The portable heater of claim 11 wherein each connector is a hasp.

15. The portable heater of claim 11 wherein the heat source is a propane burner.

16. The portable heater of claim 11 further comprising clamp means for securing the heat source to the one conduit section.

17. The portable heater of claim 11 wherein each conduit section is constructed of material having sufficient rigidity to support the weight of at least one person sitting on the section.

18. The portable heater of claim 11 further comprising wheels on one end of the connected conduit sections for rolling the connected sections to a desired location.

* * * * *